United States Patent [19]

Ziu

[11] Patent Number: 4,930,544
[45] Date of Patent: Jun. 5, 1990

[54] DOUBLE-CONTAINMENT THERMOPLASTIC PIPE ASSEMBLY

[75] Inventor: Christopher G. Ziu, Charlestown, Mass.

[73] Assignee: Asahi/America, Inc., Medford, Mass.

[21] Appl. No.: 260,444

[22] Filed: Oct. 20, 1988

Related U.S. Application Data

[62] Division of Ser. No. 66,936, Jun. 25, 1987, Pat. No. 4,786,088.

[51] Int. Cl.$^5$ ............................................. F16L 9/18
[52] U.S. Cl. ................................. 138/113; 138/111; 138/115; 138/148
[58] Field of Search ............... 138/111, 112, 113, 114, 138/115, 148; 285/55, 331, 369; 174/28

[56] References Cited

U.S. PATENT DOCUMENTS

| | | |
|---|---|---|
| 1,481,255 | 1/1924 | Cumfer ................................. 138/114 |
| 2,344,424 | 3/1944 | Singleton . |
| 2,475,635 | 7/1949 | Parsons . |
| 2,650,112 | 8/1953 | Kinkhead . |
| 2,756,032 | 7/1956 | Dowell . |
| 2,860,311 | 11/1958 | Balian . |
| 2,938,569 | 5/1960 | Goodrich . |
| 3,246,917 | 4/1966 | Martin . |
| 3,722,925 | 3/1973 | Robbins . |
| 3,785,407 | 1/1974 | Waite et al. . |
| 3,789,129 | 1/1974 | Ditscheid ............................ 138/113 |
| 3,847,208 | 11/1974 | Ollendorf . |
| 3,899,007 | 8/1975 | Miller . |
| 4,095,041 | 6/1978 | Netzel et al. . |
| 4,098,476 | 7/1978 | Jutte et al. . |
| 4,100,367 | 7/1978 | Netzel ................................. 138/113 |
| 4,157,194 | 6/1979 | Takahashi . |
| 4,182,378 | 1/1980 | Dieter . |
| 4,184,702 | 1/1980 | Morris . |
| 4,250,927 | 2/1981 | Newburg . |
| 4,250,928 | 2/1981 | Nishikawa . |
| 4,280,535 | 7/1981 | Willis . |
| 4,345,785 | 8/1982 | Bradford . |
| 4,397,304 | 8/1983 | Villain . |
| 4,400,019 | 8/1983 | Fruck . |
| 4,413,733 | 11/1983 | Dunn et al. . |
| 4,537,426 | 8/1985 | Carter, Sr. . |
| 4,573,527 | 3/1986 | McDonough . |
| 4,633,913 | 1/1987 | Carty et al. . |

FOREIGN PATENT DOCUMENTS

| | | |
|---|---|---|
| 399192 | 7/1924 | Fed. Rep. of Germany . |
| 3105406 | 9/1982 | Fed. Rep. of Germany ...... 138/113 |
| 1054035 | 1/1967 | United Kingdom . |

*Primary Examiner*—James E. Bryant, III
*Attorney, Agent, or Firm*—Anthony J. Casella; Gerald E. Hespos

[57] ABSTRACT

A double-containment thermoplastic pipe assembly is provided to prevent against potentially hazardous spills or leaks of chemicals and the like. The double-containment pipe assembly comprises a containment pipe and at least one carrier pipe disposed therein. The carrier pipe is retained in spaced relationship to the containment pipe by support clips with outwardly extending radially aligned legs. Restraint couplings may be disposed at selected locations along the double-containment pipe assembly. The restraint couplings include a carrier portion, a containment portion and a connecting portion extending therebetween. Double-containment pipe fittings also are provided to ensure complete double-containment protection throughout an entire double-containment pipe assembly.

5 Claims, 5 Drawing Sheets

DOUBLE-CONTAINMENT THERMOPLASTIC PIPE ASSEMBLY

This application is a divisional of U.S. Patent Application Ser. No. 066,936 filed on June 25, 1987, now Pat. No. 4,786,088.

BACKGROUND OF THE INVENTION

Thermoplastic pipes and valves are widely used in the chemical and petrochemical industries because of the ability of many thermoplastics to withstand prolonged exposure to caustic chemicals. Thermoplastics also tend to be less expensive and lighter than comparable metallic pipes and valves.

The chemical industry and the public have become increasingly aware of the potentially catastrophic effects of certain chemical spills or leaks. Many jurisdictions have enacted regulations and legislation intended to enhance the safety of the chemical industry and to minimize the possibility of leaks or spills. Additionally, high insurance rates and the possibility of liability in the event of a spill or leak have encouraged the chemical industry to consider technological improvements that will reduce the possibility of a leak.

Double pipes comprising an inner fluid carrying pipe and an outer pipe have been employed to achieve many objectives. Most typically, double pipes are used for heat insulation or heat exchange. However, double pipe systems have been used to prevent leaks or spills. Certain of these systems also have included detector means between the inner and outer pipes for sensing the occurrence of a leak. The detector means typically has comprised an electronic sensor that is operative to sense the presence of an electrically conductive liquid between the inner and outer pipes and to generate an appropriate signal to indicate the existence of a leak from the inner pipe.

One double-containment pipe system for thermoplastic pipes is shown in U.S. Pat. Ser. No. 4,157,194 which issued to Takahashi on June 5, 1979. More particularly, U.S. Pat. Ser. No. 4,157,194 shows a linear outer pipe that is formed with integral inwardly extending and radially aligned support ribs. An inner pipe is concentrically disposed within the outer pipe and is dimensioned to be supported on the ribs. The assembly of double-containment thermoplastic pipes shown in U.S. Pat. Ser. No. 4,157,194 further includes fittings which enable conversion to single pipes at elbow fittings, T-connections and such. The fittings of U.S. Pat. Ser. No. 4,157,194 include a pipe segment to mate with the linear inner fluid carrying pipe of the double-containment pipe system, and a flange which effectively seals off an end of the double-containment pipe section. Thus, the system shown in U.S. Pat. Ser. No. 4,157,194 includes double-containment pipes which extend along linear sections, but which do not extend through fittings. The double-containment pipes shown in U.S. Pat. Ser. No. 4,157,194 have several substantial deficiencies. In particular, the outer pipe with the integral inwardly extending flanges is difficult and very expensive to manufacture, and prevents the use of standard "off the shelf" pipes. Second, the system shown U.S. Pat. Ser. No. 4,157,194 does not provide for double-containment systems at the fittings at which leaks are quite likely to occur.

Another system of nested pipes is disclosed in U.S. Pat. Ser. No. 4,098,476 which shows a generally frustoconical member for supporting an inner tubular member concentrically within an outer tubular member for use in a cold optics system which requires a telescope to be supported inside an evacuated housing. The frustoconical support must be slid longitudinally over the inner tubular member.

Many dual pipe systems have been developed to insulate stove pipes and such. Examples of these pipes are shown in U.S. Pat. Ser. No. 2,650,112 which issued to Kinkead on Aug. 25, 1953; U.S. Pat. Ser. No. 2,756,032 which issued to Dowell on July 24, 1956; and U.S. Pat. Ser. No. 3,847,208 which issued to Ollendorf on Nov. 12, 1974.

Other double-containment pipes are shown in U.S. Pat. Ser. No. 4,182,378 which issued to Dieter on Jan. 8, 1980 (oil pipe); U.S. Pat. Ser. No. 3,899,007 which issued to Miller on Aug. 12, 1975 (underground high temperature conduit); U.S. Pat. Ser. No. 2,860,311 which issued to Balian on Nov. 11, 1958 (wave guide); U.S. Pat. Ser. No. 4,095,041 which issued to Netzel on June 13, 1978 (gas insulated transmission line cable); U.S. Pat. Ser. No. 4,250,927 which issued to Newburg on Feb. 17, 1981 (aircraft ducts); U.S. Pat. Ser. No. 4,280,535 which issued to Willis on July 28, 1981 (drill pipe); U.S. Pat. Ser. No. 4,397,308 which issued to Villain on Aug. 9, 1983 (solar sensor) and U.S. Pat. Ser. No. 4,250,928 which issued to Nishikawa on Feb. 17, 1981.

Still other devices are known for connecting multi-layer pipes. For example, U.S. Pat. Ser. No. 4,573,527 issued to McDonough on Mar. 4, 1986 and shows a complex connecting member for joining the pipes of a heat exchanger. U.S. Pat. Ser. No. 4,400,019 issued to Fruck on Aug. 23, 1983 and shows a connector for joining multilayer pipes which comprise an inner plastic pipe, an outer steel casing and a cement grout mixture therebetween. U.S. Pat. Ser. No. 4,345,785 issued to Bradford on Aug. 24, 1982 and shows a connector for an insulated pipe, while U.S. Pat. Ser. No. 4,184,702 issued to Morris on Jan. 22, 1980 and shows a connection for certain plumbing fixtures.

The extensive prior art work on double pipe systems generally does not show efficient systems for thermoplastic pipes that can be used with stock pipe items and that can be readily assembled in the field by personnel with little special training.

Accordingly, it is an object of the subject invention to provide a double-containment pipe assembly that can employ available thermoplastic pipes.

It is another object of the subject invention to provide a double-containment pipe assembly that can be readily assembled in the field to meet the demands of any particular pipe system.

A further object of the subject invention is to provide a double-containment pipe system that can provide double-containment protection through fittings.

An additional object of the subject invention is to provide a double-containment pipe system that can accommodate and control thermal expansion along the length of the pipe.

Still a further object of the subject invention is to provide a double-containment pipe system that is well suited to use with electronic sensing systems for sensing the presence of a leak.

SUMMARY OF THE INVENTION

The subject invention is directed to a double-containment pipe assembly comprising at least one outer or containment pipe and at least one carrier pipe disposed within each containment pipe and extending generally parallel thereto. A plurality of containment and carrier pipes may be secured in end to end relationship. Both the containment pipe and the carrier pipe are formed from a thermoplastic material, with the particular thermoplastic material being selected in accordance with the characteristics of the fluids to be carried by the double-containment pipe assembly.

The double-containment pipe assembly may further comprise at least one support means for supporting the carrier pipe in a preselected position relative to the containment pipe. The support means may be constructed to permit the passage of electronic sensing means between the containment and carrier pipes for sensing the presence of a liquid therebetween. The support means may comprise a generally planar support member having one or more apertures extending therethrough with each aperture being dimensioned to receive a carrier pipe. The external dimensions of the planar support member may be selected to permit the planar support member to be disposed within the containment pipe and generally orthogonal to the longitudinal axis of the containment pipe. The planar support member may be dimensioned to contact the inner circumferential surface of the containment pipe. The planar support member preferably also is formed from a thermoplastic material.

The support means may alternatively comprise a generally arcuate mounting member and a plurality of generally radially extending support legs. The arcuate mounting member may be dimensioned to at least partly surround the carrier pipe. Thus, the inside diameter defined by the arcuate mounting member may substantially equal the outside diameter of the carrier pipe about which the arcuate mounting member will be positioned. The arcuate mounting member may extend through an arc of between approximately 180° and 360°, and preferably extends through an arc of approximately 270°. The arcuate mounting member preferably is formed from a thermoplastic material that is dimensioned and formed to exhibit a resiliency. Thus, the arcuate support member may be slidably advanced along the length of the containment pipe, or preferably may be resiliently snapped over the containment pipe. The arcuate mounting member may be retained on the carrier pipe by the frictional interfit therebetween. Alternatively, the arcuate mounting member may be fused or welded to the carrier pipe.

The support legs of the support means may be rigidly connected to the arcuate mounting member and extend generally radially therefrom. Preferably, at least three support legs are mounted to and extend generally radially from the arcuate mounting member. The support legs may be dimensioned to enable the mounting of the carrier pipe substantially concentrically within the containment pipe.

The double-containment pipe assembly may further comprise restraint couplings to permit the generally end to end joining of a pair of carrier pipes and a corresponding pair of containment pipes, while also controlling thermal expansion. The restraint coupling may comprise a carrier pipe portion and a containment pipe portion joined to one another. The restraint coupling may be of unitary construction with the respective carrier and containment pipe portions thereof having substantially identical cross-sectional dimensions as the carrier and containment pipes to which the restraint coupling will be joined. The connection between the carrier and containment pipe portions of the restraint coupling may be substantially continuous entirely around the restraint coupling thereby creating longitudinal containment sections between adjacent restraint couplings. Alternatively, however, one or more cutouts may be provided between the carrier and containment pipe portions of the restraint coupling to permit the passage of detection means through the restraint coupling.

The restraint coupling may be physically secured to external support means for preventing or controlling thermal expansion. More particularly, thermal expansion is much more likely to occur along the carrier pipe. If thermal expansion was allowed to occur over very long lengths of the carrier pipe, it is possible that dimensional changes of the carrier pipe could cause the carrier pipe to buckle sufficiently to contact the inner surface of the containment pipe at some point along the length of the assembly. The forces generated by such buckling or by the resulting contact could damage the pipes. Periodically disposed restraint couplings will positively connect the carrier pipe to the containment pipe at selected locations along the length of the assembly. Thus, the thermal expansion of the carrier pipe will be controlled by the periodic positive connection to the containment pipe at the restraint couplings.

The double-containment pipe system preferably extends through fittings such as elbows and T-connections. In certain situations, the dimensions of the carrier and containment pipes will enable the elbow fitting of the containment pipe to merely be placed over the elbow fitting of the carrier pipe. However, in embodiments where the diameter of the containment pipe is only slightly larger than the diameter of the carrier pipe, the containment pipe elbow fittings comprise a plurality of members, each of which extends through an angular bend smaller than the angular bend of the carrier pipe. These various members of the containment pipe elbow fitting may be joined to one another sequentially in end to end relationship around the elbow fitting of the carrier pipe. Thus, two short 45° containment pipe fitting members disposed in end to end relationship may be required to enclose a single 90° elbow fitting for the carrier pipe.

Containment pipe T-fittings also are formed from a plurality of separate members. More particularly, the containment pipe T-fitting members comprise T-fitting halves which may be substantially symmetrical with one another. The containment T-fitting halves may be matable along a plane extending substantially orthogonal to the two runs of the T-fitting and cutting the branch of the T-fitting substantially longitudinally in half. In still another alternative, the halves of the T-fitting of the containment pipe may be matable along a plane extending longitudinally with respect to both runs and the branch.

The dimensions of the containment pipe may be greater at fittings than at longitudinal sections. More particularly, the dimensions of the containment pipe at fittings will be selected in accordance with anticipated thermal expansion characteristics of the carrier pipe to ensure that the carrier pipe does not buckle against the containment pipe fittings with the resulting possibility of damage to the carrier or containment pipe. Additionally, the location of the restraint couplings may be carefully selected with respect to the fittings to carefully control thermal expansion both in longitudinal sections adjacent to the fittings and in the fittings. The above described fittings may further be employed in end to end relationship with short longitudinal sections to create expansion loops to further control thermal expansion.

DETAILED DESCRIPTION OF THE PREFERRED EMBODIMENTS

Figure 1:
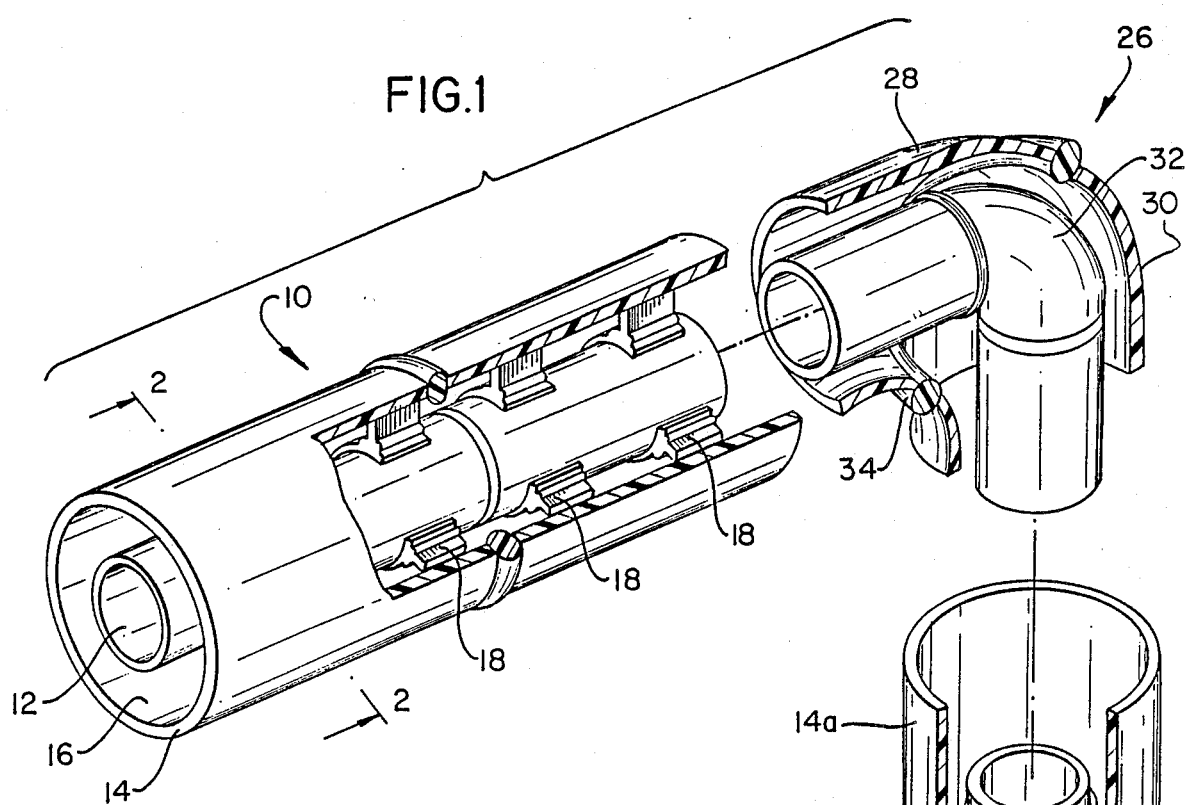
FIG. 1 is a perspective view, partly in section, of a double-containment pipe assembly including an elbow fitting.
Figure 2:
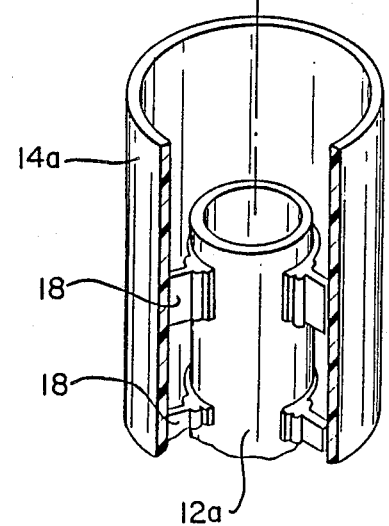
FIG. 2 is a cross-sectional view of a double-containment pipe taken along line 5—5 in FIG. 4.
Figure 2:
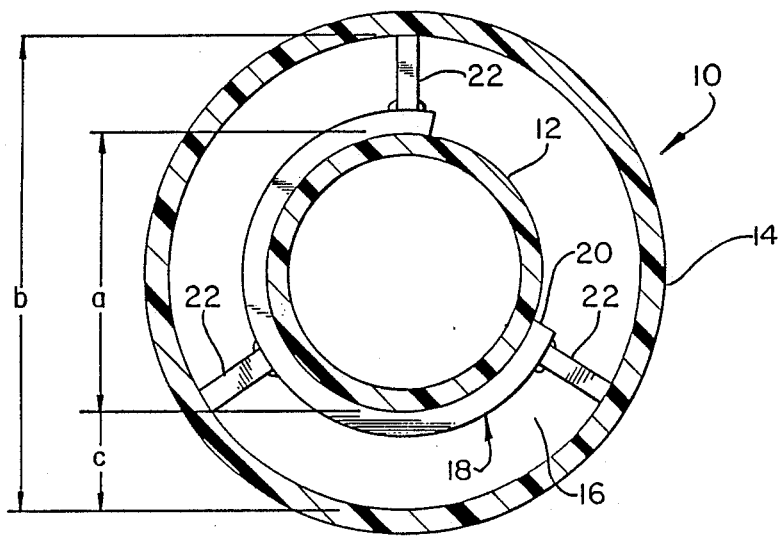

The double-containment pipe assembly of the subject invention is illustrated in FIGS. 1 and 2 and is identified generally by the numeral 10. The double-containment pipe assembly 10 comprises at least one inner carrier pipe 12 and at least one outer containment pipe 14. The carrier pipes 12 are secured in end to end relationship and are employed to carry a fluid which may be a hazardous chemical. The containment pipes 14 also are secured in end to end relationship and surround and enclose the carrier pipes 12 to provide protection against a potentially catastrophic leak or spill from the carrier pipe 12.

Both the carrier pipe 12 and the containment pipe 14 are formed from a thermoplastic material. The particular type of thermoplastic material will depend upon the fluid characteristics of the chemicals being transported in the carrier pipe and on the required performance characteristics for the containment pipe. In most situations, the carrier pipe 12 and the containment pipe 14 may be formed from either a copolymer polypropylene or a polyvinylidene fluoride (PVDF).

The outside diameter of the carrier pipe 12, as indicated by dimension "a" in FIG. 2, is less than the inside diameter of the containment pipe 14 as indicated by dimension "b". As a result, an annular space 16 is defined between the carrier pipe 12 and the containment pipe 14. The radial dimension "c" of the annular space 16 will depend in part upon system specifications, including the temperatures of the fluids to be carried through the carrier pipe 12. Additionally, the radial dimension "c" of the annular space 16 may vary at certain locations throughout a double-containment pipe system, and in particular in the vicinity of fittings which achieve a change in direction of the double-containment pipe assembly 10. This aspect of the invention is described and illustrated in greater detail below.

Figure 3:
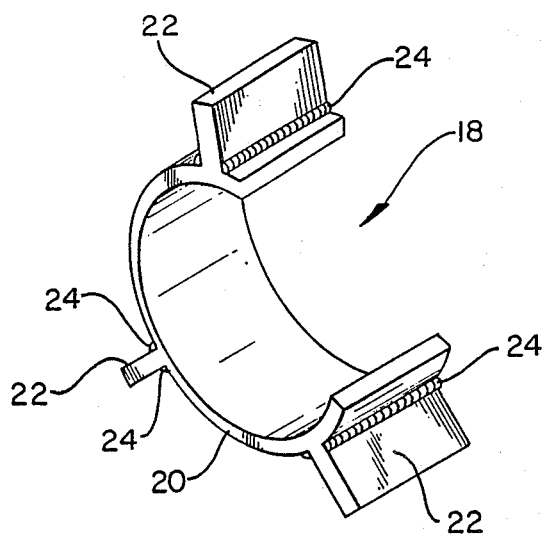
FIG. 3 is a perspective view of the support clip of the subject invention.
Figure 4:
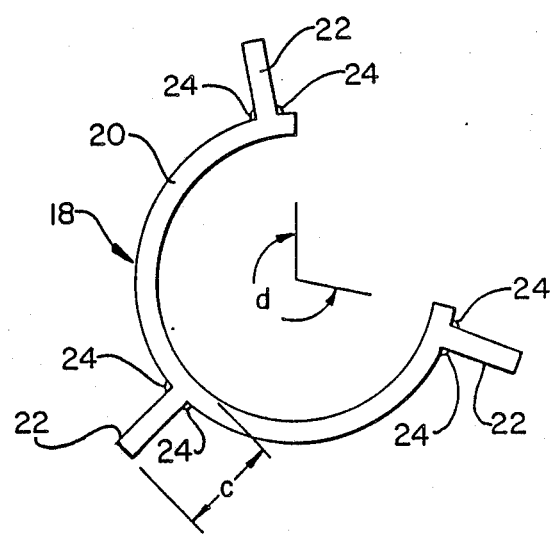
FIG. 4 is an end view of the support clip shown in FIG. 1.
Figure 5:
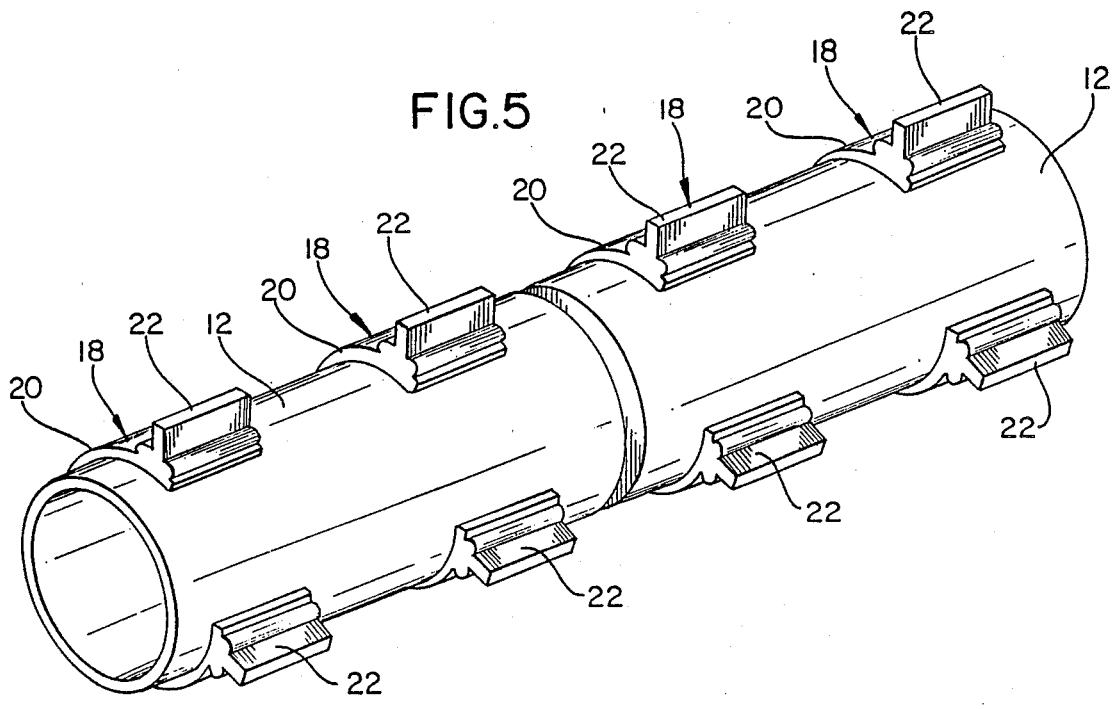
FIG. 5 is a perspective view of a length of carrier pipe with support clips mounted thereon.

The carrier pipe 12 is held in generally concentric relationship to the containment pipe 14 by a support clip 18 which is further illustrated in FIGS. 3-5. More particularly, the support clip 18 comprises an arcuate mounting portion 20 which extends through a substantially cylindrical arc of approximately 260°-280°, and preferably 270°, as illustrated by angle "d" in FIG. 4. The inside diameter of the mounting portion 20 substantially equals the outside diameter "a" of the carrier pipe 12. Additionally, the mounting portion 20 of the support clip 18 is formed from a resilient material to permit the mounting portion 20 to be opened sufficiently to pass over the carrier pipe 12, and then to be released and biasingly retained on the carrier pipe 12.

The support clip 18 further comprises a plurality of support legs 22 which extend rigidly from the mounting portion 20 in generally radial directions and are spaced from one another by about 120°. As illustrated in FIGS. 1-5, the support legs 22 are joined to the mounting member 20 by generally longitudinally extending fillets 24 which define a bead of weldment applied using known thermoplastic welding techniques. Alternatively, the entire support clip 18 including the mounting portion 20 and the support legs 22 may be molded as a unitary member as shown in the other figures hereto. Preferably, the support clip 18 is formed from the same thermoplastic material as the carrier pipe 12 to facilitate the welding of the support clip 18 to the carrier pipe 12.

The radial dimension of the support clip 18, defined by the radial dimension of the support leg 22 plus the radial thickness of the mounting member 20 substantially equals or is slightly less than the radial dimension "c" of the annular gap between the carrier pipe 12 and the containment pipe 14. As a result, as shown most clearly in FIG. 2, the support clip 18 will hold the carrier pipe 12 in generally concentric relationship relative to the containment pipe 14. However, as shown in FIGS. 1 and 2, the annular space 16 between the carrier pipe 12 and the containment pipe 14 will permit the longitudinal passage of sensing means, such as a cable with the ability to detect and locate the presence of a conductive fluid in the annular space 16 between the carrier pipe 12 and the containment pipe 14.

As shown in FIG. 1, the containment pipe assembly 10 may extend through fittings such as the elbow fitting 26. As illustrated in FIG. 1, the elbow fitting 26 is provided for situations where it is anticipated that the fluid transported through the carrier pipe 12 will not be at a substantially elevated temperature, and therefore will not cause the carrier pipe 12 to thermally expand relative to the containment pipe 14. In view of these system specifications, it is unnecessary for the containment pipe to be substantially enlarged in the vicinity of the elbow connection 26. As a result, depending upon the magnitude and differences between the outside diameter "a" of the carrier pipe 12 and the inside diameter "b" of the containment pipe 14, it may be necessary to form the double-containment 90° elbow 26 from two 45° containment pipe portions 28 and 30 respectively. The single 90° elbow fitting 32 for the carrier pipe then can readily be fit into the 45° containment pipe elbow portion 28, and the second 45° containment pipe portion 30 then can be fit over the 90° carrier pipe elbow 32 and welded to the first 45° containment pipe portion 28 by weldment 34. A second double-containment pipe assembly comprising a carrier pipe 12a and a containment pipe 14a then can be connected in end to end relationship to the double-containment 90° elbow assembly 26 as shown in FIG. 1.

On each side of the double-containment 90° elbow assembly 26, the respective carrier pipe portions 12 and 32 may be fused to one another prior to the connection of the containment pipes. This preferred order of connection is achieved by having longitudinally offset ends, and enables a positive visual inspection of the butt fusion of the carrier pipe. The containment pipe 14 then is connected to the containment pipe 45° bend portion 28. In certain situations, as explained further below, it will be necessary to achieve the butt fusion of the carrier and containment pipes simultaneously. In these situations, the ends of the carrier and containment pipes will be substantially in line with one another rather than the offset configuration referred to previously.

Figure 6:
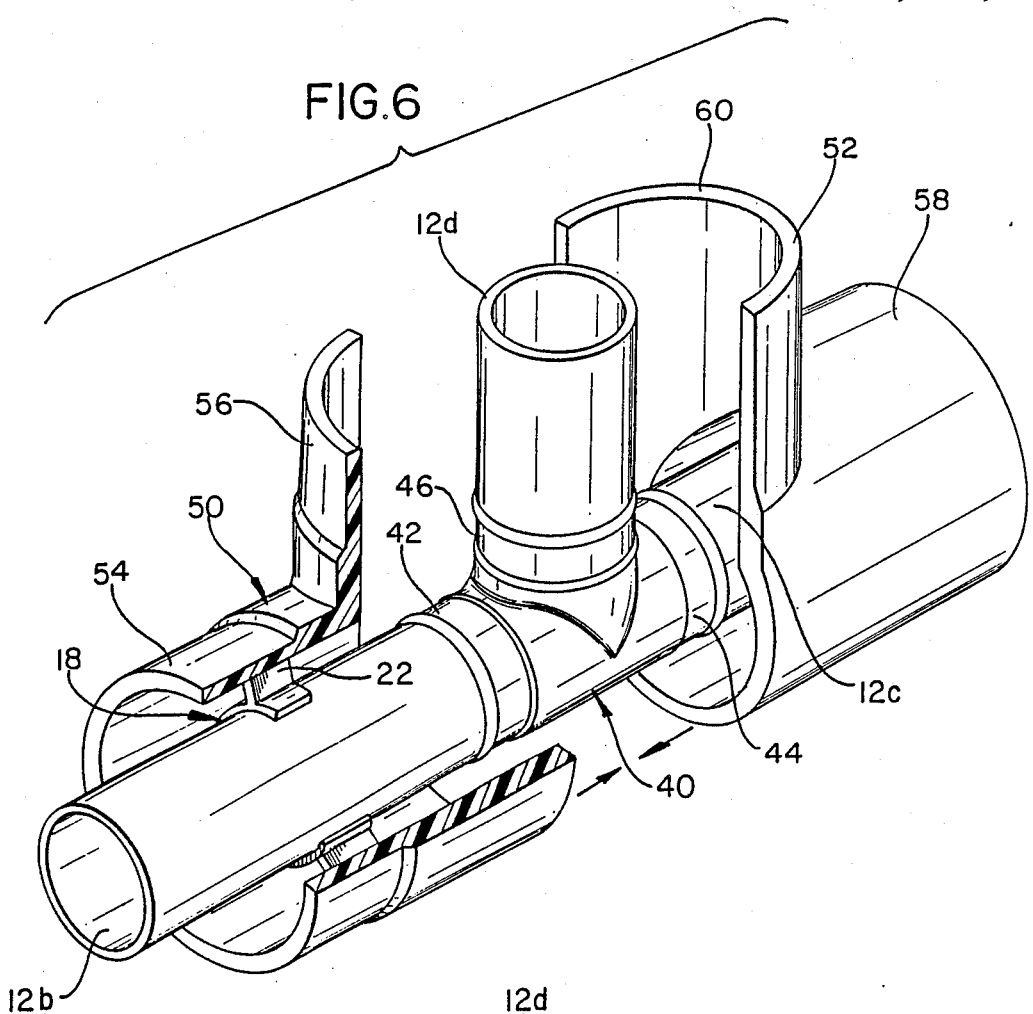
FIG. 6 is a perspective view of two halves of a T-fitting.
Figure 7:
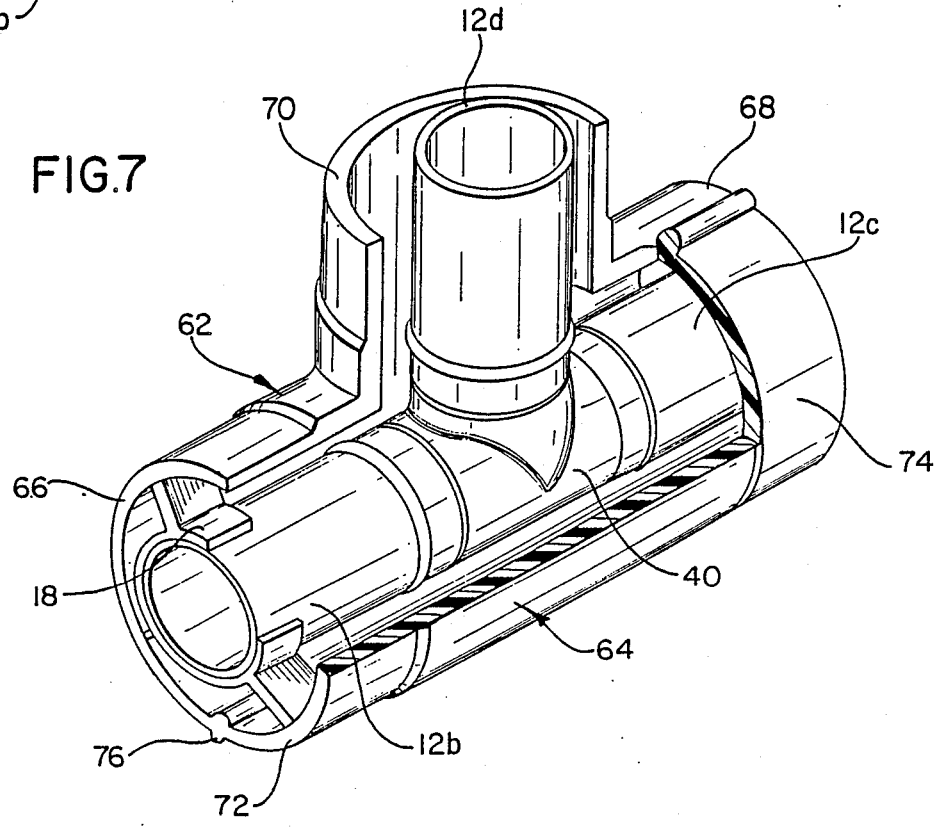
FIG. 7 is a perspective view of an alternate T-fitting.

Two optional arrangements for T-fittings are shown in FIGS. 6 and 7 respectively. More particularly, a T-fitting of a containment pipe must be assembled around the T-fitting for the carrier pipe. As shown in FIG. 6, the T-fitting for the carrier pipe is identified generally by the numeral 40. The carrier pipe T-fitting 40 is of generally standard unitary construction, and includes a pair of aligned runs 42 and 44 and a branch 46 perpendicular to the runs 42 and 44. The carrier pipe T-fitting 40 may be connected to carrier pipes 12b, 12c and 12d by butt fusion or other similar attachment techniques. Support clips 18 with appropriately dimensioned support legs 22 are then snapped onto the carrier pipes as explained previously.

The containment pipe T-fitting shown in FIG. 6 is formed from containment pipe T-fitting halves 50 and 52 respectively. The containment T-fitting half 50 includes a cylindrical run portion 54 and a semicylindrical branch portion 56. Similarly, the containment pipe T-fitting half 52 includes a cylindrical run portion 58 and a semicylindrical branch portion 60. The T-fitting halves 50 and 52 may be welded to one another and around the carrier pipe T-fitting 40. The assembled combination of the carrier pipe T-fitting 40 and the welded containment pipe T-fitting halves 50 and 52 may then be joined to adjacent linear sections of carrier and containment pipe. To enable this connection, it is necessary that the carrier pipe portion 40 of the T-fitting extend to or beyond the containment pipe portion thereof. More particularly, the carrier pipe 12c has a length sufficient to put its end substantially in line with the end of the run 58 on the containment pipe T-fitting half 52. Similarly, the carrier pipe 12b is dimensioned to extend to or beyond the run portion 54 of the containment pipe T-fitting half 50.

FIG. 7 shows an alternate construction for a double-containment T-fitting. More particularly, the carrier pipe T-fitting 40 is substantially identical to the carrier pipe T-fitting described above and illustrated in FIG. 6. Additionally, the carrier pipe T-fitting 40 is joined to carrier pipe sections 12b, 12c and 12d as explained above. The containment pipe T-fitting, however, shown in FIG. 7 comprises containment pipe T-fitting halves 62 and 64 which are formed to be joined to one another along a plane extending substantially longitudinally through both the runs and the branch of the T-fitting. Thus, the containment pipe T-fitting half 62 includes semicylindrical run portions 66 and 68 and semicylindrical branch portion 70. Similarly, the containment pipe T-fitting half 64 includes semicylindrical run portions 72 and 74 and a semicylindrical branch portion (not shown). The containment pipe T-fitting halves 62 and 64 are joined to one another by welding as indicated generally by the numeral 76.

Figure 8:
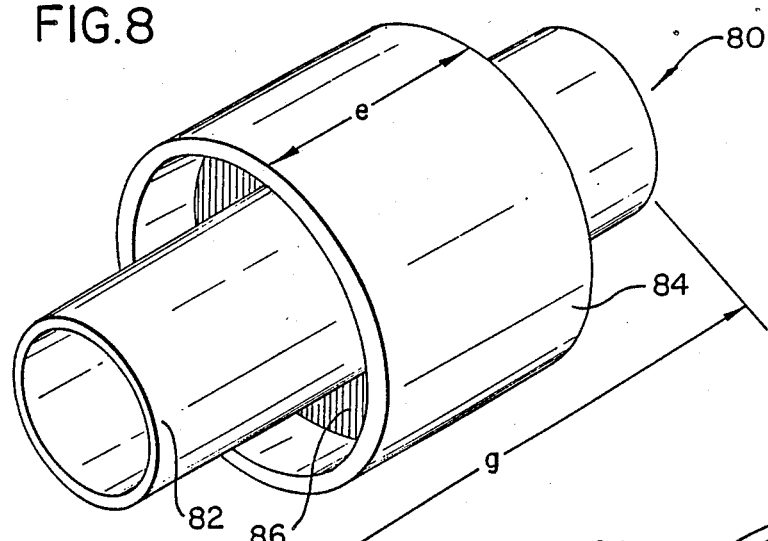
FIG. 8 is a perspective view of a restraint coupling.
Figure 9:
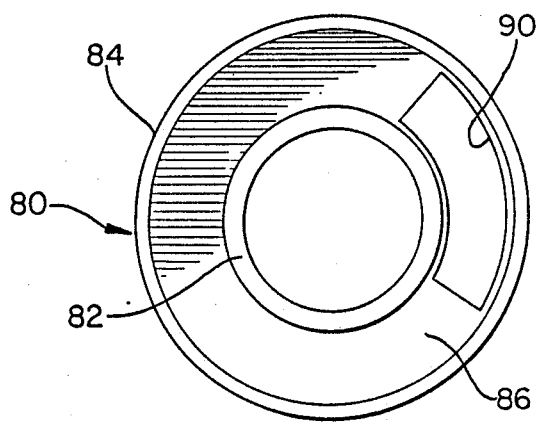
FIG. 9 is an end view of the restraint coupling shown in FIG. 8.
Figure 10:
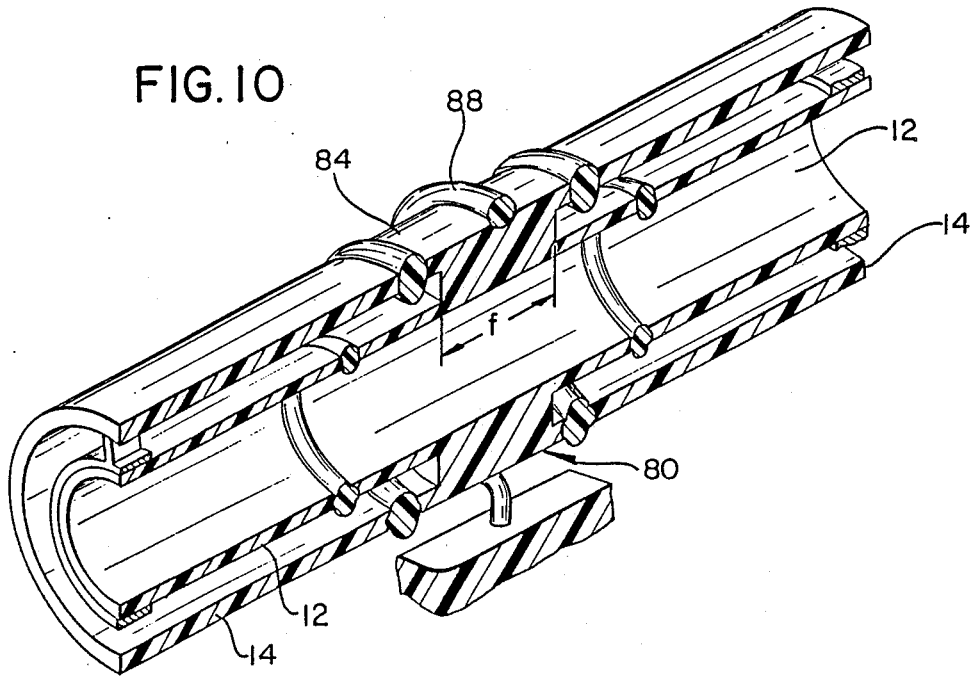
FIG. 10 is a cross-sectional view of a restraint coupling incorporated into a double-containment pipe system.

The double-containment pipe assembly further comprises restraint coupling 80 as shown in FIGS. 8–10. More particularly, the restraint coupling 80 comprises a carrier portion 82, a containment portion 84 and a connecting portion 86 extending therebetween. As shown most clearly in FIG. 10, the restraint coupling 80 is of substantially unitary construction and is formed from the same thermoplastic material as the carrier and containment pipes 12 and 14 with which it is employed. Additionally, the diameter of the containment portion 84 of the restraint coupling 80 substantially equals the diameter of the containment pipe 14 to which the restraint coupling 80 is joined. Similarly, the diameter of the carrier portion 82 is substantially equal to the diameter of the carrier pipe 12 with which the restraint coupling 80 is used. Furthermore, the relative position of the carrier portion 82 relative to the containment portion 84 is substantially identical to the relative positions of the carrier and containment pipes 12 and 14. Thus, for the embodiment illustrated in FIG. 10, the carrier portion 82 of the restraint coupling 80 is substantially concentric with respect to the containment portion 84 thereof to enable precise mating with concentrically disposed carrier and containment pipes 12 and 14. In other embodiments, however, an eccentric orientation may be desirable or necessary to mate with a specified eccentric orientation of the carrier and containment pipes 12 and 14. Additionally, in other embodiments, a plurality of carrier pipes may be incorporated into a single containment pipe, and the restraint coupling used therewith will include a plurality of carrier portions.

The function of the restraint coupling 80 is to control differential thermal expansion between the carrier and containment pipes. More particularly, with reference to FIG. 10, the connecting portion 86 which joins the carrier and containment portions 82 and 84 positively controls and localizes relative movement between the carrier and containment pipes 12, 12a and 14, 14a. Thus, a clamp means illustrated generally by the numeral 88 in FIG. 10 may be affixed to the containment portion 84 of the restraint coupling 80 to positively control and localize the inevitable thermal expansion between the carrier and containment pipes 12 and 14 of the double-containment pipe assembly. As will be explained further below, the simple restraint coupling 80 can be employed in combination with the fittings described above to enable the double-containment pipe system to be carried through portions of a system in which fittings are disposed, without the risk of damage occurring at the fittings as a result of differential expansion.

As shown in FIGS. 8 and 10 respectively, the containment portion 84 of the restraint coupling 80 has a longitudinal length "e" which is greater than the longitudinal length "f" of the connecting portion 86. By providing the containment portion 84 with a length "e" that is greater than the length "f" of the connecting portion, the containment portion 84 can readily be butt fused in end to end relationship to an adjacent containment pipe 14 as shown most clearly in FIG. 10. Preferably, the containment portion 84 of the restraint coupling 80 will extend beyond the connecting portion 86 at least one-half inch to ensure the presence of a sufficient amount of thermoplastic material to be melted during the butt fusion process.

In a similar manner, the carrier portion 82 has a longitudinal length "g" which also is greater than the length "f" of the connecting portion 86 to facilitate the butt fusion of the carrier portion 82 to an adjacent carrier pipe 12 in end to end relationship as shown in FIG. 10. In the preferred embodiment, the length of the carrier portion 82 of the restraint coupling 80 exceeds the length "e" of the containment portion 84 thereof. This greater length of the carrier portion 82 enables the butt fusion of the carrier portion 82 to the carrier pipe 12 to be carried out first with the completed weld being entirely visible for inspection. The containment pipe 14 then is slid over both the carrier pipe 12 and the supports 18 and is butt fused to the containment portion 84 of the restraint coupling 80, with that entire weld being readily visible for inspection. In certain embodiments, however, the carrier portion 82 cannot extend beyond the containment portion 84 on both ends of the restraint coupling 80. In particular, the system may be assembled such that both the carrier and containment pipes to which the restraint coupling 80 will be joined are already in place on at least one side of the specified location of the restraint coupling 80. In these situations, the carrier and containment pipes to which the restraint coupling 80 will be joined terminate in line with one another, and the carrier and containment portions 82 and 84 of the restraint coupling 80 must also terminate in line with one another on one end of the restraint coupling 80. Thus, for these embodiments, the carrier and containment portions 82 and 84 of the restraint coupling 80 may be butt fused simultaneously in end to end relationship to the respective carrier and containment pipes. Even in these situations, however, the carrier and containment portions 82 and 84 will extend beyond the connecting portion 86 to ensure the presence of sufficient material to be partly melted during the butt fusion welding process.

As noted above, the primary function of the restraint coupling 80 is to control differential thermal expansion that typically will occur when hot fluids pass through the carrier pipe 12. More particularly, hot fluids may cause the carrier pipe 12 to expand substantially, while the annular air gap 16 will substantially prevent the heat from affecting the containment pipe 14. The substantial thermal expansion of the carrier pipe 12 can cause the carrier pipe 12 to buckle relative to the containment pipe 14, thereby causing contact between the carrier and containment pipes 12 and 14, or by causing substantial forces between the support arms 22 and the containment pipe 14 in areas of maximum buckling. Additionally, differential thermal expansion is particularly likely to cause a potentially damaging contact between the containment and carrier pipes at fittings such as elbows as shown in FIG. 1 herein and T-fittings as shown in FIG. 6 and 7 herein. The restraint coupling 80 enables a clamp means 88 to be mounted to the containment portion 84 of the restraint coupling 80 and to simultaneously hold both the containment portion 84 and the carrier portion 82 in a fixed longitudinal position relative to one another. As a result, the differential expansion can be controlled to locations intermediate adjacent restraint couplings 80 along the length of the double containment pipe system. The spacing between restraint couplings 80 will be selected in accordance with system temperature and other parameters to ensure that damaging contact is avoided.

In certain embodiments, it will be desirable to isolate longitudinal sections of the annular space 16 between the carrier pipe 12 and the containment pipe 14. In other embodiments, however, it may be desirable or necessary to provide communication along an extended longitudinal portion of the annular space 16, such as in those double-containment pipe systems which employ a continuously extending sensing means through the annular space 16. In embodiments where it is necessary or desirable to isolate portions of the annular space 16, the connecting portion 86 of the restraint couplings 80 will be substantially solid. However, in embodiments where it is necessary or desirable to provide communication between successive annular spaces 16, apertures, such as the aperture 90 shown in FIG. 9, may be provided extending the entire longitudinal distance through the connecting portion 86. A plurality of such apertures 90 may be provided at spaced locations around the connecting portion 86.

Figure 11:
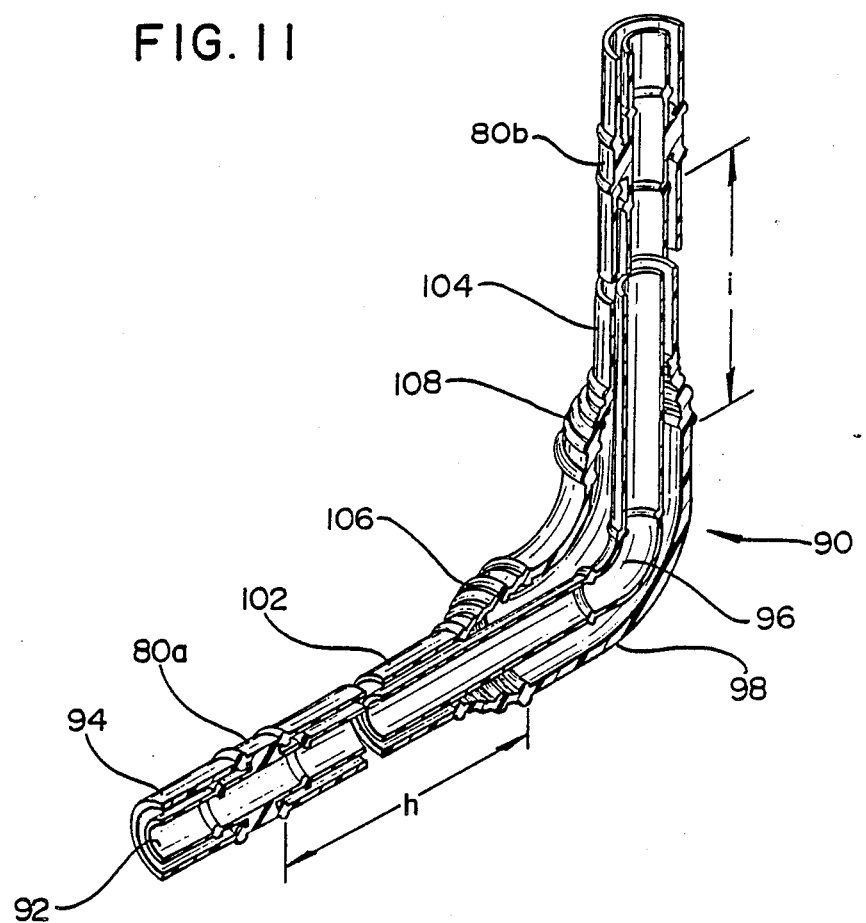
FIG. 11 is a cross-sectional view of a double-containment pipe assembly with both a T-fitting and restraint couplings.

As noted above, it is particularly important to control differential thermal expansion in the vicinity of fittings that change the direction of the double containment pipe system. FIG. 11 will be referred to explain two possible installation approaches for controlling differential expansion in the vicinity of a 90° elbow fitting. In particular, FIG. 11 shows a section of a double-containment pipe system which includes a carrier pipe identified generally by the numeral 92 and a containment pipe identified generally by the numeral 94. The carrier pipe 92 includes a 90° elbow fitting 96. Similarly, the containment pipe 94 includes a 90° elbow fitting 98 which surrounds the carrier elbow fitting 96. The system 90 shown in FIG. 11 further includes restraint couplings 80a and 80b disposed on opposite sides of the elbow fittings 96 and 98. Thermal expansion of the carrier pipe 92 in the vicinity of the elbow fittings 96 and 98 can be controlled by locating the restraint couplings 80a and 80b at small distances "h" and "i" respectively from the elbow fittings 96 and 98. As a result, the thermal expansion of the longitudinal sections of the carrier pipe 92 will effectively be directed away from the elbow fitting 96. The small amount of thermal expansion that is likely to take place between the restraint couplings 80a and 80b can be controlled so as not to exceed the tolerances within the containment elbow 98 if the distances "h" and "i" are small.

In certain instances, it may not be possible or desirable to direct all thermal expansion away from the elbow fittings. In these situations, the distances "h" and "i" as shown in FIG. 11 may be greater, and the thermal expansion may be accommodated within the containment elbow fitting 98. To accommodate such thermal expansion, the containment elbow fitting 98 is provided with a larger diameter than the containment pipe 94 elsewhere in the system. Additionally, the connections between the containment elbow 98 and the linear containment pipe segments 102 and 104 is achieved with concentric reducers 106 and 108 respectively. More particularly, the concentric reducers 106 and 108 have a frustoconical configuration wherein the large diameter end is matable with the containment elbow 98 and wherein the small diameter end is matable with the containment pipes 102 and 104 respectively. This installation approach, however, requires careful selection of the dimensions of the containment elbow 90 and careful placement of the support clips 18 relative to the carrier pipe elbow 96. More particularly, the size required for the containment elbow 98 can readily be determined by calculating the amount of thermal growth between the restraint couplings 80a and 80b based on the knowledge of anticipated temperature levels and the thermal coefficients of expansion for the particular thermoplastic material used in the system. The minimum required distance of the support clip 14 to the carrier elbow 96 can be calculated using known equations which account for the amount of thermal growth, the modulus of elasticity of the carrier pipe 92, the outside diameter of the carrier pipe 92 and the working stress at system temperature (PSI).

Figure 12:
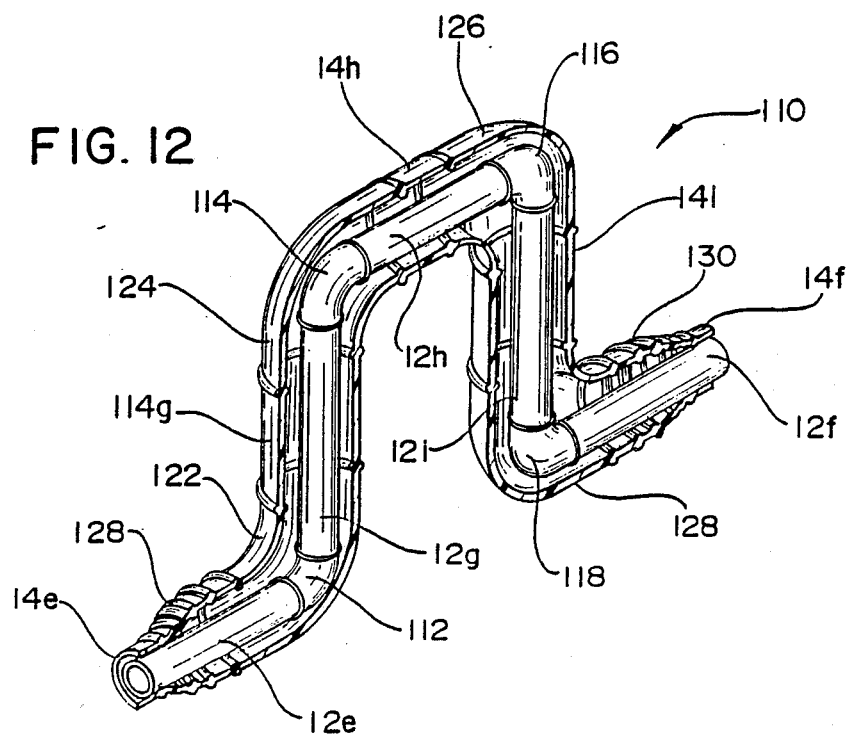
FIG. 12 is a cross-sectional view of double-containment pipe assembly expansion loop.

Another approach for accommodating thermal expansion employs a double-containment expansion loop identified generally by the numeral 110 in FIG. 12 and is incorporated into a double-containment system comprising carrier pipes 12e and 12f and containment pipes 14e and 14f. The double-containment expansion loop 110 includes four carrier elbows 112-118 and four containment elbows 122-128. The carrier elbows 112-118 all are disposed in series between carrier pipes 12e and 12f and are joined by linear carrier pipe sections 12g, 12h and 12i. The cross-sectional dimensions of the carrier pipes 12e-12i and carrier elbows 112-118 are substantially equal. The containment elbows 122-128 also are connected in series by generally linear containment pipe sections 14g, 14h and 14i. However, the containment elbows 122-128 and the containment pipe sections 14g-14i all have cross-sectional dimensions which exceed the diameter of the containment pipes 14e and 14f to accommodate the thermal expansion of the carrier pipe. To achieve this greater dimension of the containment portion, the double-containment expansion loop 110 includes reducers 130 and 132 which are substantially identical to the reducers 106 and 108 described above and illustrated in FIG. 11. The relative differences in the diameters of the carrier and containment pipes required through the double-containment expansion loop 110 can readily be determined by knowing the temperature of the fluid to be carried in the carrier pipe, the distance between the expansion loop 110 and the adjacent restraint couplings (not shown) and the thermal expansion characteristics of the thermoplastic material being employed. Similarly, the length of the various legs of the expansion loop can readily be calculated based on the known equations described above.

In summary, the double-containment pipe system of the subject invention is formed entirely from thermoplastic materials and provides exceptional protection against leaks or spills both on longitudinal sections and at fittings. Additionally, the double-containment pipe assembly of the subject invention is uniquely constructed to properly position the carrier pipe within the containment pipe and to carefully control thermal expansion. The double-containment pipe assembly comprises support clips that can be snapped into engagement with the carrier pipe and that support the carrier pipe in spaced relationship to the containment pipe. Restraint couplings are provided to control thermal expansion of the double-containment pipe assembly. The restraint coupling comprises a carrier pipe portion, a containment pipe and a connecting portion therebetween. The carrier and containment pipe portions preferably have a greater longitudinal dimension than the connecting portion. The restraint couplings can be placed at spaced apart locations along the double-containment pipe assembly and can be anchored to an external location to carefully control differential expansion. Certain containment elbows may be of a larger cross-sectional dimension than the adjacent linear containment pipes with the connections therebetween being accommodated by frustoconical reducers. The dimension of the containment elbow is selected to accommodate differential expansion that may occur between the elbow fitting and the nearest restraint coupling. Double-containment expansion loops may also be provided to accommodate thermal expansion and prevent direct and potentially damaging contact between the containment and the carrier pipe.

While the invention has been described with respect to certain preferred embodiments, it is apparent that various changes can be made without departing from the scope of the invention as defined by the appended claims.

What is claimed is:

1. A restraint coupling for a double-containment pipe assembly, said pipe assembly comprising a pair of spaced apart axially aligned inner carrier pipes of a first diameter and a pair of spaced apart axially aligned outer containment pipes of a second diameter, said second diameter being greater than said first diameter such that a generally annular space exists between the inner and outer pipes, said restraint coupling being formed from a thermoplastic material of unitary construction and comprising a continuous generally cylindrical containment portion defining a diameter substantially equal to the second diameter and having opposed axial ends for end-to-end axial alignment with the containment pipes, a generally cylindrical carrier portion defining a diameter substantially equal to the first diameter disposed within and generally parallel to said containment portion, said carrier portion having opposed axial ends for end-to-end axial alignment with the carrier pipes, and a connecting portion rigidly extending between and connecting said containment and carrier portions, said containment and carrier portions having longitudinal lengths greater than the length of said connecting portion, said carrier portion extending in opposed axial directions from the connecting portion distances that are at least equal to distances by which the containment portion extends axially from the connecting portion, whereby the carrier portion and the containment portion of the restraint coupling can be fused in end-to-end relationship with carrier and containment pipes of the double-containment pipe assembly.

2. A restraint coupling as in claim 1 wherein the connecting portion is substantially solid and continuous at all locations thereon between said carrier and containment portions.

3. A restraint coupling as in claim 1 wherein said connecting portion includes at least one longitudinally extending aperture extending therethrough.

4. A restraint coupling as in claim 1 wherein the carrier portion thereof has an axial length greater than the axial length of the containment portion thereof, such that the carrier portion extends in a first axial direction from the connecting portion a greater distance than the containment portion extends from the connecting portion in said first axial direction.

5. A restraint coupling as in claim 4 wherein the carrier portion extends from the connecting portion in both axial directions distances that are greater than the extension of the containment portion from the connecting portion.

* * * * *

REEXAMINATION CERTIFICATE (3401th)

United States Patent [19]
Ziu

[11] B1 4,930,544
[45] Certificate Issued Dec. 23, 1997

[54] DOUBLE-CONTAINMENT THERMOPLASTIC PIPE ASSEMBLY

[75] Inventor: Christopher G. Ziu, Charlestown, Mass.

[73] Assignee: Asahi/America, Inc., Medford, Mass.

Reexamination Request:
No. 90/002,336, May 1, 1991

Reexamination Certificate for:
Patent No.: 4,930,544
Issued: Jun. 5, 1990
Appl. No.: 260,444
Filed: Oct. 20, 1988

Related U.S. Application Data

[62] Division of Ser. No. 66,936, Jun. 25, 1987, Pat. No. 4,786,088.

[51] Int. Cl.$^6$ ........................................ F16L 9/18
[52] U.S. Cl. ................... 138/113; 138/111; 138/115; 138/148
[58] Field of Search .................... 138/111, 112, 138/113, 114, 115, 148, 109, 155, 120, 141, 147, 103, 104, 106, 107; 285/55, 331, 369, 179, 114, 423, 905; 174/28; 248/55, DIG. 1

[56] References Cited

U.S. PATENT DOCUMENTS

| | | | |
|---|---|---|---|
| 240,497 | 4/1881 | Babcock | 138/148 |
| 616,809 | 12/1898 | Seltzer | 138/148 |
| 683,514 | 10/1901 | Stephens | 138/148 |
| 2,475,635 | 7/1949 | Parsons | 138/114 |
| 2,613,166 | 10/1952 | Gronemeyer | 138/148 |
| 2,741,997 | 4/1956 | Parker | 285/423 |
| 2,768,840 | 10/1956 | Coberly | 138/148 |
| 2,937,662 | 5/1960 | Green | 138/148 |
| 3,540,223 | 11/1970 | Ebbe | 138/148 |
| 3,907,336 | 9/1975 | Siegmund | |
| 3,987,991 | 10/1976 | Keever et al. | 138/106 |
| 4,157,194 | 6/1979 | Takahashi | 138/113 |
| 4,353,763 | 10/1982 | Simons | 138/141 |
| 4,380,168 | 4/1983 | Ibe | |
| 4,420,970 | 12/1983 | Organi | |
| 4,522,432 | 6/1985 | Press | 138/147 |
| 4,723,441 | 2/1988 | Sweeney | |
| 4,779,652 | 10/1988 | Sweeney | |

FOREIGN PATENT DOCUMENTS

| | | | |
|---|---|---|---|
| 227590 | 7/1909 | Germany | |
| 1193000 | 5/1965 | Germany | |
| 1234163 | 2/1967 | Germany | |
| 2757076 | 6/1979 | Germany | 138/107 |
| 854189 | 11/1960 | United Kingdom | |
| 2023296 | 12/1979 | United Kingdom | |

*Primary Examiner*—David Scherbel
*Attorney, Agent, or Firm*—Anthony J. Casella; Gerald E. Hespos; Ludomir A. Budzyn

[57] ABSTRACT

A double-containment thermoplastic pipe assembly is provided to prevent against potentially hazardous spills or leaks of chemicals and the like. The double-containment pipe assembly comprises a containment pipe and at least one carrier pipe disposed therein. The carrier pipe is retained in spaced relationship to the containment pipe by support clips with outwardly extending radially aligned legs. Restraint couplings may be disposed at selected locations along the double-containment pipe assembly. The restraint couplings include a carrier portion, a containment portion and a connecting portion extending therebetween. Double-containment pipe fittings also are provided to ensure complete double-containment protection throughout an entire double-containment pipe assembly.

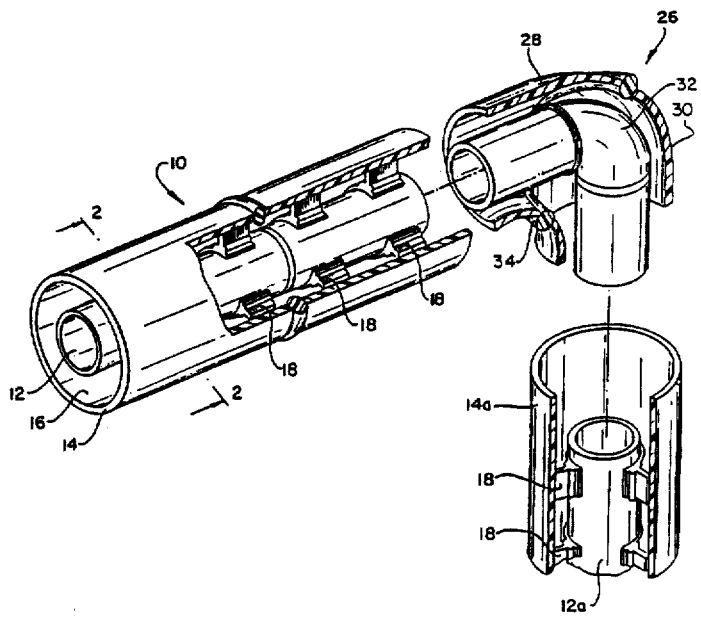

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

New claim 6 is added and determined to be patentable.

*6. A restraint coupling as in claim 1 further comprising a clamp means mounted externally on the containment portion of the restraint coupling and mounted to an external support for holding the restraint coupling in a fixed longitudinal position.*

* * * * *